Nov. 21, 1961
H. E. WHEELER
3,009,373
TOOL HOLDER FOR BORING AND TURNING
POLYGONAL SHAPED SURFACES
Original Filed May 10, 1957
3 Sheets-Sheet 1
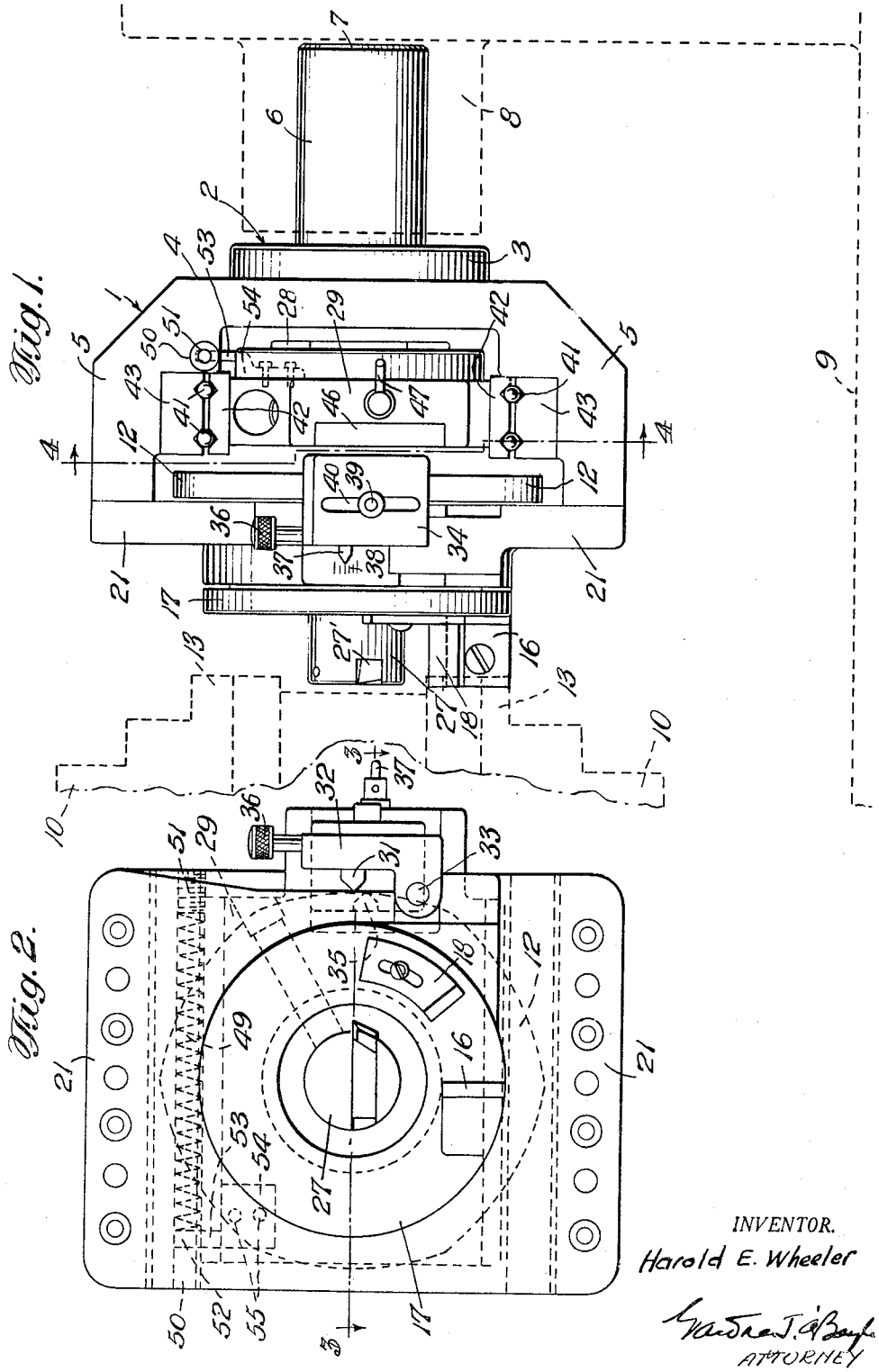
INVENTOR.
Harold E. Wheeler
ATTORNEY

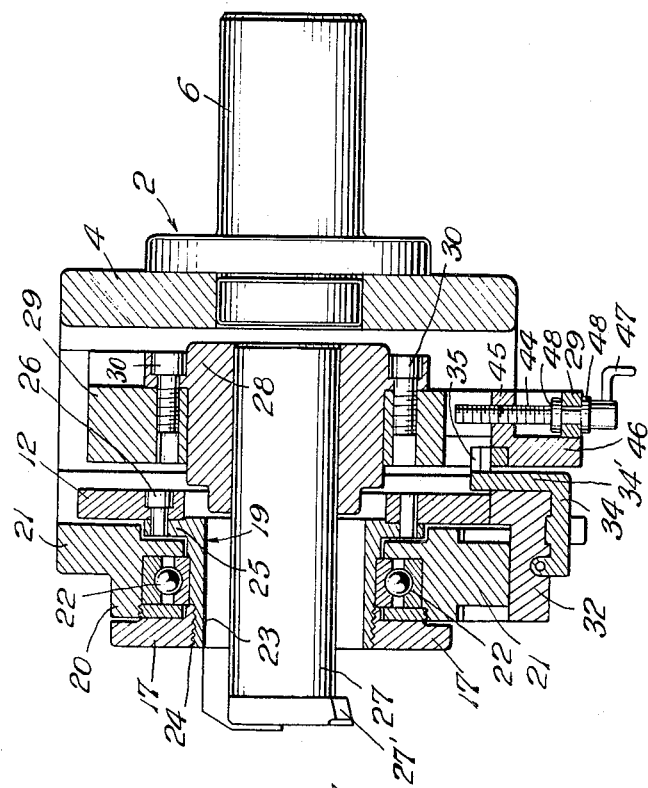
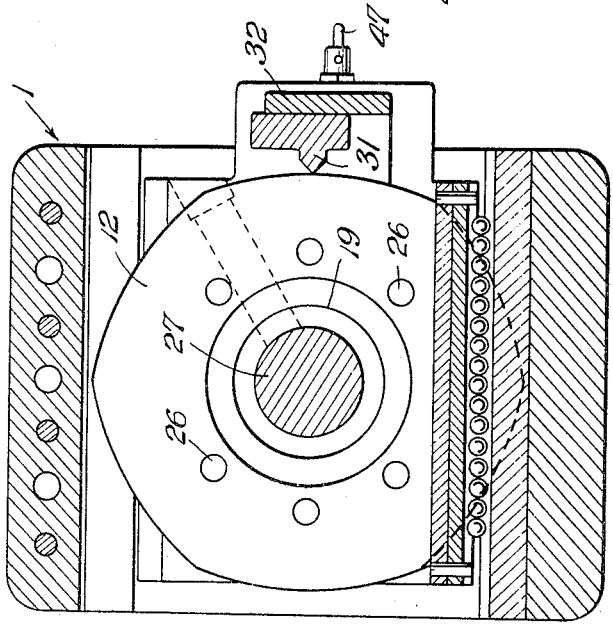

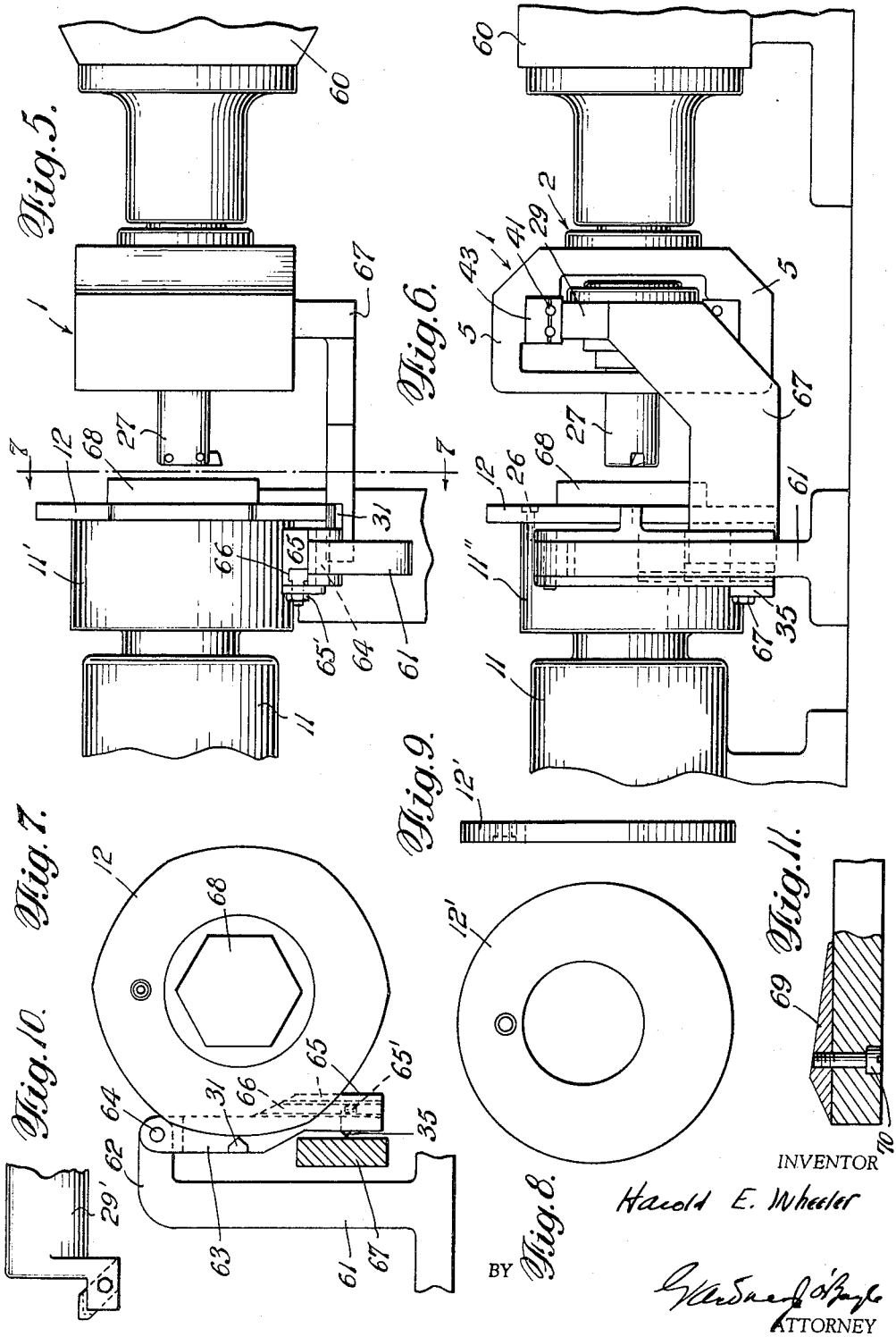

United States Patent Office 3,009,373
Patented Nov. 21, 1961

3,009,373
TOOL HOLDER FOR BORING AND TURNING
POLYGONAL SHAPED SURFACES
Harold E. Wheeler, 119 N. Elmira St., Athens, Pa.
Original application May 10, 1957, Ser. No. 658,294, now Patent No. 2,906,156, dated Sept. 29, 1959. Divided and this application Apr. 13, 1959, Ser. No. 805,848
10 Claims. (Cl. 82—19)

My invention relates to tool holders for machine tools, and more particulary to an improved polygon box tool for use with lathes or other machine tools of the character wherein the work is rotated about its axis.

The present application is a division of my application Serial No. 658,294, filed May 10, 1957, for Box Tools, now Patent 2,906,156, issued September 29, 1959.

The present invention is particularly designed for the formation of surfaces of polygonal shape in cross-section, either externally or internally of the work, and comprises essentially, a box or housing having a holder for a suitable cutting tool, the holder being adapted to slide transversely of the box under the control of a cam member journalled in the body of the box. The cam is driven by the lathe spindle and is formed with a face of contour to generate the desired polygonal shape on or in the work piece. The size of the polygonal work surface can be varied by means of an adjustable operating finger or cam follower which is normally spring biased into contact with the face of the cam, whereby as the cam revolves, it imparts a reciprocating motion to the tool holder with respect to the center of the work.

The adjustable operating finger or cam follower is an important feature of my invention, since it permits the use of a single cam for various sizes of polygonal shaped work surfaces, and accordingly, eliminates the necessity of providing a plurality of cams of different sizes for a specific polygonal shaped work surface. The adjustable cam follower arrangement comprises a knife edge carried by a suitable support member pivotally mounted on the box or housing for the tool, the amplitude of the movement of the knife edge, when it is caused to reciprocate by rotation of the cam, depending upon the difference between the diameters across the corners and the flats, respectively, of the cam. A second knife edge is adjustably mounted upon an arm operatively connected to the support for the first mentioned knife edge, said second knife edge being constructed and arranged to bear against an arm or fitting operatively connected to the slide or holder for the tool, whereby the amount or degree of movement of the first knife edge, transmitted through the medium of the second knife edge to the tool holder, corresponds to the distance the adjustable knife edge is from the pivotal axis of the support for the first knife edge. In other words, adjustment of the position of the second knife edge on its support changes the effective length of the fulcrum arm defined by the pivot point of the fixed knife support and the bearing point of the second knife so that the degree of movement of the tool carrying slide transversely of the box or housing is proportionately varied. By means of this adjustable cam follower arrangement, a single cam may be used for different sizes of desired polygonal shaped work surfaces.

An object of my invention is to provide an improved tool holder for use with lathes and other machine tools.

Another object of my invention is to provide an improved box tool designed to form polygonal shaped work surfaces externally or internally of the work piece.

Still another object of my invention is to provide an improved box tool constructed and arranged whereby a single cam may be used for different sizes of a specific polygonal shape of desired work surface.

Yet another object of my invention is to provide an improved cam having an external cam surface ground so as to generate sharp corners.

A further object of my invention is to provide an improved box tool arrangement for forming polygonal shaped work surfaces, adapted for use with engine or turret lathes.

A still further object of my invention is to provide an improved box tool arrangement constructed and arranged to bore or turn a tapered surface workpiece.

Yet a further object of my invention is to provide a box tool having an improved cam follower arrangement wherein the cam may be mounted on the lathe spindle for forming polygonal shaped surfaces on comparatively large work, for boring an eccentric hole or opening in a concentric running shaft, or for turning an eccentric diameter thereon and for turning profiles.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

FIGURE 1 is a side elevational view, showing the box tool of the present invention mounted in a lathe, the lathe parts being shown in dotted lines;

FIG. 2 is a front view of the box tool shown in FIG. 1;

FIG. 3 is a sectional view taken on line 3—3 of FIG. 2;

FIG. 4 is a sectional view taken on line 4—4 of FIG. 1;

FIG. 5 is a plan view of a modified form of the invention;

FIG. 6 is a side elevational view of the arrangement shown in FIG. 5;

FIG. 7 is a sectional view taken on line 7—7 of FIG. 5;

FIG. 8 is a front elevational view of a modified form of cam;

FIG. 9 is an end view of the cam shown in FIG. 8;

FIG. 10 is a plan view of a tool for external cutting; and

FIG. 11 is a detail sectional view of a cam for use in taper forming and turning.

Referring to the drawings, and more particularly to FIG. 1, the box unit, designated generally by numeral 1, is shown mounted in operative position in a lathe. In this embodiment of the invention the box tool is a self-contained unit, that is to say, the cam and its associated cam follower arrangement, together with the holder for the tool and the slide member, are mounted within or on the box housing, in contradistinction to the modification shown in FIGS. 5–7, wherein the cam and cam follower device are mounted on the lathe spindle, the box which carries the tool holder and the slide, being mounted on the turret of a turret lathe. The unit, as shown in FIG. 1, is supported in a lathe by means of an adapter or fitting 2, having a base 3, bolted or otherwise secured to the rear face 4, of the box housing 5, and a stub shaft 6, positioned centrally of the base 3, the shaft being seated in tight friction fit in an opening 7, formed in a support member 8, mounted on the lathe carriage 9. Desirably, the support member 8, which is in the nature of a modified foot or tailstock, is provided with manually operated means, not shown, for moving the same horizontally or longitudinally with respect to the lathe carriage, and with longitudinal power feed means associated with the lead screw of the lathe.

The workpiece is mounted in a suitable chucking device 10, carried by the lathe spindle and rotates therewith, rotary movement of the chuck being transmitted to the cam 12 by means of a chuck jaw 13, adapted for driving engagement with an abutment 16 secured to a rotary collar 17. The jaw is retained in driving contact with the abutment by means of a member 18, formed from spring material, adjustably mounted on the collar in peripheral spaced relation with respect to the abutment. As will be described more fully hereinafter, the cam 12 and collar 17 are mounted on a sleeve through which the cutting tool arbor extends outwardly of the face of the collar 17, the inboard end of the arbor seating in friction fit in an opening formed in a tool carrier which in turn is fixedly secured to a slide member, transverse sliding movement of said member being under the control of the cam 12, and its associated cam follower arrangement.

Referring to FIG. 3, the sleeve 19, which carries the collar 17 and the cam 12, is rotatably mounted within a boss 20, formed in the front side cover member 21, by means of ball bearings 22. The end portion 23 of the sleeve is threaded as at 24 to receive the collar 17, and the rear portion of the sleeve is formed with a flange 25 to which the cam 12 is secured by means of bolts or screws 26. The cutting tool arbor 27 seats in a holder or tool carrier 28, fixed to a slide member 29 by means of bolts or other suitable fastening means 30.

The adjustable cam follower arrangement comprises a knife edge 31 (FIG. 2) attached to a support 32, pivotally mounted on the front edge of the side cover member 21, by means of a pivot pin 33. Slidably mounted on the front face of the support 32 is an L-shaped bracket 34 having a knife edge 35, extending outwardly at right angles to the plane of the leg 34' of the bracket, said knife edge 35, having bearing engagement with the slide 29, whereby movement of the support 32 by knife edge 31, which is under control of the cam 12, causes the slide to move outwardly of the housing a proportional distance, depending upon the distance knife edge 35 is from the pivotal axis 33 of the support 32. Vertical adjustment of bracket 34 may be had by means of a thumb screw 36 threaded into the bracket, and having its end portion seated in an extension attached to the pivotal support 32. The amount of vertical displacement of knife edge 35 is indicated by means of a pointer 37 and associated scale 38, the pointer being secured to the edge of the movable bracket 34 and in line with the contact edge of the knife. The scale, having graduations in inches and in fractions thereof, is attached to the front face of support member 32, and the pointer is brought into register with a scale division, corresponding to a particular size of workpiece, by rotating the thumb screw 36. After the pointer has been adjusted to desired position with respect to the scale, it may be fixed against accidental displacement by means of a set screw 39, threaded into the pivotal support 32, the set screw riding in a slot 40 formed in the face of the movable bracket 34.

As explained hereinabove, the tool holder 28 is secured to the slide 29, and moves transversely of the box under the influence of the cam 12. As will be seen in FIG. 1, the slide moves transversely on steel balls 41, mounted in hardened and ground V ways 42 and 43, the inner way 42 being secured to the top of the slide. Adjustment of the tool holder 28, relative to the axis of rotation of the sleeve 19 is effected by means of a screw 44 (FIG. 3), which threads into a member 45, attached to an insert 46, on which the tool holder slide may be moved transversely of the box, when the screw 44 is turned by the handle 47. It will be noted that the screw is restrained against outward or inward movement by shoulders 48, fixed to the screw and arranged on opposite sides of a front flange portion formed on the slide adjacent the insert 46. It will thus be seen that rotation of the screw causes the slide, which carries the tool holder, to move transversely of the box or housing.

Referring to FIG. 2, the slide 29 is returned to its initial position within the housing, after being moved outwardly by the cam 12, by means of a spring 49 seated in a suitable bore 50 formed in the top of the housing. The bore is closed at the front by means of a screw plug 51, and the bottom of the bore in the vicinity of the rear of the box is provided with a slot into which the end portion 52 of an arm 53, carried by a plate 54, extends. The arm forms a stop or an abutment at the rear of the spring, whereby, when the slide is moved outwardly by the cam, the spring is compressed, the slide being forced inwardly of the housing by the spring after the knife edge 31 passes over a high point of the cam. The plate 54 is secured to the slide 29 by means of bolts 55, the arm 53 being offset to bring it into vertical alignment with the slot in the bottom of the bore, as shown in FIG. 1.

In the above described embodiment of the invention the cam face is of hexagonal shape and the tool or cutter 27', as shown, is of the type used for forming internal work surfaces. In operation of the device, the parts being in the position shown in FIG. 1, the box support member 8, which is supported on the lathe carriage is moved to the right a sufficient distance to permit chucking of a suitable workpiece, not shown, it being understood that during this movement of the box the abutment 16 and retainer member 18, which have sliding bearing engagement with the chuck jaw 13, are free to move from driving contact with the chuck jaw. The workpiece, which has been previously prepared for the formation of an internal surface of hexagonal cross-section, for example, by boring, is secured in the chuck in the usual manner, and the box support is then moved on the lathe carriage in the direction of the spindle until the end of the cutter tool arbor 27 contacts the end of the workpiece projecting from the chuck. At this point the cutting tool is brought to its required cutting position with respect to the work by adjusting the tool holder support by means of the adjusting screw 44, and pointer 37 is moved a scale graduation for the particular size of workpiece. When the workpiece is rotated, rotary movement is imparted to cam 12; and as the cam revolves, support 32 for knife edge 31 is oscillated about its pivot, the amplitude of this movement depending on the difference between the diameters across the corners and the flats of the cam, respectively, and the amount of this movement transmitted to the slide 29 which carries the tool holder 28, is determined by the distance the adjustable knife edge 35 is from the pivot 33 of support 32. Since the distance between the adjustable blade and the pivot was initially set in accordance with the size of the internal surface of hexagonal cross-section to be formed in the workpiece, the amount of movement transmitted to the slide remains constant as the cutter tool is moved longitudinally with respect to the workpiece, thus forming the desired polygonal shape interiorly of the work.

The adjustable finger or cam follower arrangement permits the use of a single cam for any desired size of surface and thus eliminates the necessity of providing a plurality of different cams for each shape.

If a polygonal shaped surface is to be formed exteriorly of the work, a cutter tool of the type shown in FIG. 10 is substituted for the tool shown in FIG. 1, the operation of forming an exterior surface being substantially the same as above described in connection with the formation of the interior surface.

Referring to FIGS. 5-7, there is shown a modified form of the invention wherein the cam 12 is mounted on a rechuck 11' on the lathe spindle 11, the box 1 being mounted on the hexagon turret 60 of the lathe. In this embodiment of the invention, the adjustable cam follower arrangement is carried by a bracket member 61 secured to the lathe, said bracket having an upper horizontal portion 62 on which a member 63, which carries the knife edges 31 and 35, is pivotally mounted by means of a pivot pin 64. As will be seen in FIG. 7, member 63 is formed with an offset 65 having a slotted portion 66 to receive the holder for the adjustable knife edge 35, which is maintained in adjusted position by means of a set screw 65'.

Transverse movement of the slide 29 which carries the tool holder is effected by means of a slide extension 67 in the form of an L-shaped member having one leg secured to the slide (FIG. 6), the inner surface of the other leg having bearing engagement with the adjustable knife edge 35. Rotation of the cam 12 causes member 63 to oscillate about its pivot 64 and a proportional part of this movement is transmitted to the slide extension by the knife edge 35, the amount of the movement of the slide being determined by the distance between said knife edge and the pivot 64. The workpiece 68 is mounted for rotation in the rechuck 11', and the tool 27 is of the type used for internal boring. For forming external surfaces a tool 29' (FIG. 10) is substituted for the tool 27, the operation of forming such surfaces being essentially the same as for internal surfacing.

By means of the above described modification it is possible to handle comparatively large workpieces by reason of the increased work space resulting from the use of the slide extension, together with the mounting of the cam on the rechuck. Additionally, by mounting the box on the hexagon turret of the lathe, other operations on the work can be readily accomplished since the box, and its associated slide extension, is easily turned to a non-operative position, in accordance with the conventional manner of operating the turret.

For turning or boring a tapered surface workpiece a taper shoe 69 (FIG. 11) is attached to the inner surface of the slide extension arm, opposite the adjustable knife edge, by means of a bolt 70, adapted to thread into the shoe. Also, for adjustable eccentric cylindrical turning and boring cam 12' (FIG. 8) may be substituted for the cam 12, or other cam designed for the function of polygonal shaped surfaces.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A tool holder for use with a machine tool having a rotatable head, said tool holder comprising a housing, a support for a cutting tool slidably mounted in the housing, a cam member mounted upon the rotatable head of the machine tool, a support for a cam follower adjacent said rotatable head, and adjustable cam follower means adapted to transmit a proportional part of the amplitude of the cam to the cutting tool holder support, the adjustable cam follower means comprising an arm pivotally mounted on said support, a cam abutment member secured to said arm, a second abutment member adjustably mounted in the vicinity of the free end portion of the arm, said second abutment member having driving bearing engagement with an extension formed on the cutting tool holder support, whereby when the cam is rotated, said support is reciprocated transversely of the housing.

2. A tool holder for use with a machine tool having a rotatable head, said tool holder comprising a housing, a support for a cutting tool slidably mounted in the housing, means for biasing the support in a direction inwardly of the housing, a cam member mounted on the rotatable head of the machine tool, a support for a cam follower adjacent the rotatable head, and adjustable cam follower means adapted to transmit a proportional part of the amplitude of the cam to the cutting tool holder support, said adjustable cam follower means comprising an arm pivotally mounted on said support, a cam abutment member secured to said arm, a second abutment member adjustably mounted in the vicinity of the free end portion of the arm, said second abutment member having driving bearing engagement with an extension formed on the cutting tool holder support, whereby when the cam is rotated, said support is reciprocated transversely of the housing.

3. A tool holder for use with a machine tool having a rotatable head, said tool holder comprising a housing, a support for a cutting tool slidably mounted in the housing, means for biasing the support in a direction inwardly of the housing, comprising a helical spring seated in a bore formed in the housing transversely thereof, a cam member mounted upon the rotatable head of the machine tool, a support for a cam follower adjacent said rotatable head, and adjustable cam follower means adapted to transmit a proportional part of the amplitude of the cam to the cutting tool holder support, the adjustable cam follower means comprising an arm pivotally mounted on the cam follower support, a knife edge secured to the arm and having bearing engagement with the cam face, a second knife edge support adjustably mounted on said arm, and having a knife edge in driving bearing engagement with an extension formed on the cutting tool holder support, whereby when the cam is rotated, said support is reciprocated transversely of the housing.

4. A tool holder for use with a machine tool having a rotatable head, said tool holder comprising a housing, a support for a cutting tool slidably mounted in the housing, a cam member mounted on the rotatable head of the machine tool, a support for a cam follower adjacent the rotatable head, and adjustable cam follower means adapted to transmit a proportional part of the amplitude of the cam to the cutting tool holder support, said adjustable cam follower means comprising an arm pivotally mounted on the cam follower support, a knife edge secured to the arm and having bearing engagement with the cam face, a second knife edge support adjustably mounted on said arm, and having a knife edge in driving bearing engagement with an extension formed on the cutting tool holder support, whereby when the cam is rotated, said support is reciprocated transversely of the housing.

5. A tool holder for use with a lathe, including a rotatable head and associated chuck, said tool holder comprising a housing, a support for a cutting tool holder slidably mounted in the housing, means for biasing the support in a direction inwardly of the housing, a cam member mounted upon the lathe head, a support for a cam follower adjacent the lathe head, and adjustable cam follower means adapted to transmit a proportional part of the amplitude of the cam to the cutting tool holder support, whereby to generate a surface of non-circular cross-section of desired size, externally or internally of a work piece, said adjustable cam follower means comprising an arm pivotally mounted on the cam follower support, a cam abutment member secured to said arm, a second abutment member adjustably mounted in the vicinity of the free end portion of the arm, said second abutment member having driving bearing engagement with an extension formed on the cutting tool holder support, whereby when the cam is rotated, said support is reciprocated transversely of the housing.

6. A tool holder for use with a lathe, including a rotatable head and associated chuck, said tool holder comprising a housing, a support for a cutting tool holder slidably mounted in the housing, means for biasing the support in a direction inwardly of the housing, a cam member mounted upon the lathe head, a support for a cam follower adjacent the lathe head, and adjustable cam follower means adapted to transmit a proportional part of the amplitude of the cam to the cutting tool holder support, whereby to generate a surface of non-circular cross-section of desired size, externally or internally of a workpiece, said adjustable cam follower means comprising an arm pivotally mounted on the cam follower support, a knife edge secured to the arm and having bearing engagement with the cam face, a second knife edge support adjustably mounted on said arm, and having a knife edge in driving bearing engagement with an extension formed on the cutting tool holder support, whereby when the cam is rotated, said support is reciprocated transversely of the housing.

7. In combination with a machine tool, including a rotatable head adapted to carry a workpiece, and a tool support, a tool holder for use in forming a surface of polygonal shape in cross-section on or in a workpiece detachably mounted on the tool support, said tool holder comprising a housing, a support for a cutting a tool holder slidably mounted in the housing, means for biasing the support in a direction inwardly of the housing, a polygonal shaped cam member mounted on the rotatable head of the machine tool, a support for a cam follower adjacent the head, an adjustable cam follower carried by the support, said cam follower comprising an arm pivotally mounted on said support, a cam abutment member secured to said arm, a second abutment member adjustably mounted in the vicinity of the free end portion of the arm, said second abutment having driving bearing engagement with an extension formed on the cutting tool support, whereby when the cam is rotated said support is reciprocated transversely of the housing.

8. In combination with a lathe, including a rotatable head and associated chuck, and a tool support, a tool holder for use in forming a surface of polygonal shape in cross-section on or in a workpiece detachably mounted on the tool support, said tool holder comprising a housing, a support for a cutting tool holder slidably mounted in the housing, means for biasing the support inwardly of said housing, a cutting tool holder seated in said support, a polygonal shaped cam member mounted on the rotatable chuck head, a support for a cam follower adjacent said head, an adjustable cam follower carried by the support, said follower comprising an arm pivotally mounted on the support, a cam abutment member secured to said arm, a second abutment member adjustably mounted in the vicinity of the free end portion of the arm, said second abutment having driving bearing engagement with an extension formed on the cutting tool support, whereby when the cam is rotated said support is reciprocated transversely of the housing.

9. In combination with a lathe, including a spindle and a tool support, a tool holder for use in forming a surface of polygonal shape in cross-section on or in a workpiece detachably mounted on the machine tool support, a rechuck including chuck jaws mounted on the spindle, said tool holder comprising a housing, a support for a cutting tool holder mounted in the housing, means for biasing the support inwardly of said housing, a cutting tool holder seated in said support, a polygonal shaped cam member mounted on the rechuck, a support for a cam follower adjacent the rechuck, an adjustable cam follower carried by the support, said follower comprising an arm pivotally mounted on said support, a cam abutment member secured to said arm, a second abutment member adjustably mounted in the vicinity of the free end portion of the arm, said second abutment having driving bearing engagement with an extension formed on the cutting tool support, whereby when the cam is rotated said support is reciprocated transversely of the housing.

10. In combination with a lathe, including a rotatable head and associated chuck, and a tool support, a tool holder for use in forming a surface of polygonal shape in cross-section on or in a workpiece detachably mounted on the tool support, said tool holder comprising a housing, a support for a cutting tool holder slidably mounted in the housing, a cutting tool holder seated in the support, means for biasing said support in a direction inwardly of the housing, comprising a helical spring seated in a bore formed in the housing transversely thereof, and an arm carried by the support, said arm having its end portion extending into the bore and in contact with the free end of the spring, a polygonal shaped cam member mounted on the rotatable chuck head, a support for a cam follower adjacent said rotatable chuck head comprising an arm pivotally mounted on the support, a cam abutment member secured to said arm, a second abutment member adjustably mounted in the vicinity of the free end portion of the arm, said second abutment having driving bearing engagement with an extension formed on the cutting tool support, whereby when the cam is rotated said support is reciprocated transversely of the housing.

References Cited in the file of this patent

UNITED STATES PATENTS

| 1,659,386 | Van Hamersveld | Feb. 14, 1928 |

FOREIGN PATENTS

| 450,297 | Italy | July 12, 1949 |
| 478,598 | Italy | Feb. 25, 1953 |
| 776,471 | Great Britain | June 5, 1957 |